(12) United States Patent
Hagedorn et al.

(10) Patent No.: US 6,203,202 B1
(45) Date of Patent: Mar. 20, 2001

(54) METHOD FOR MONITORING AND CONTROLLING THE OPERATION OF ROTARY DRUMS BORNE ON SLIDING BLOCKS AND A SLIDING BLOCK BEARING THEREFOR

(75) Inventors: Alexander Hagedorn, Pulheim; Christoph Troeder, Aachen, both of (DE)

(73) Assignee: KHD Humboldt Wedeg AG, Cologne (DE)

( * ) Notice: Subject to any disclaimer, the term of this patent is extended or adjusted under 35 U.S.C. 154(b) by 0 days.

(21) Appl. No.: 09/352,446

(22) Filed: Jul. 13, 1999

(30) Foreign Application Priority Data

Jul. 18, 1998 (DE) .............................................. 198 32 364

(51) Int. Cl.⁷ .............................. F16C 32/06; F16C 17/03
(52) U.S. Cl. .......................... 384/116; 384/117; 384/247; 384/310
(58) Field of Search .................................... 384/100, 114, 384/116, 117, 247, 309, 310, 311, 312, 624

(56) References Cited

U.S. PATENT DOCUMENTS

| | | | |
|---|---|---|---|
| 4,032,199 | * | 6/1977 | Jenness ................................. 384/310 |
| 4,512,671 | * | 4/1985 | Giers et al. ........................... 384/215 |
| 4,643,592 | * | 2/1987 | Lewis et al. .......................... 384/100 |
| 5,397,183 | * | 3/1995 | Lu et al. ................................. 384/1 |

\* cited by examiner

*Primary Examiner*—Thomas R. Hannon
(74) *Attorney, Agent, or Firm*—Sonnenschein Nath & Rosenthal

(57) ABSTRACT

In order to monitor the function of the sliding block bearing elements in view of the hydrostatically and/or hydrodynamically generated compressed oil film or, respectively, compressed oil cushion, given rotating drums seated on sliding blocks such as, for example, tube mills, and to control the operation in conformity with the result of the monitoring, it is inventively proposed that the lubricating gap thickness, i.e., the distance between the bearing surface of the sliding bearing shoe and the running surface of the rotating drum supported thereon via the lubricating gap or, respectively, the compressed oil film, is directly measured during operation and the rotating drum operation is controlled dependent on this measured quantity.

12 Claims, 1 Drawing Sheet

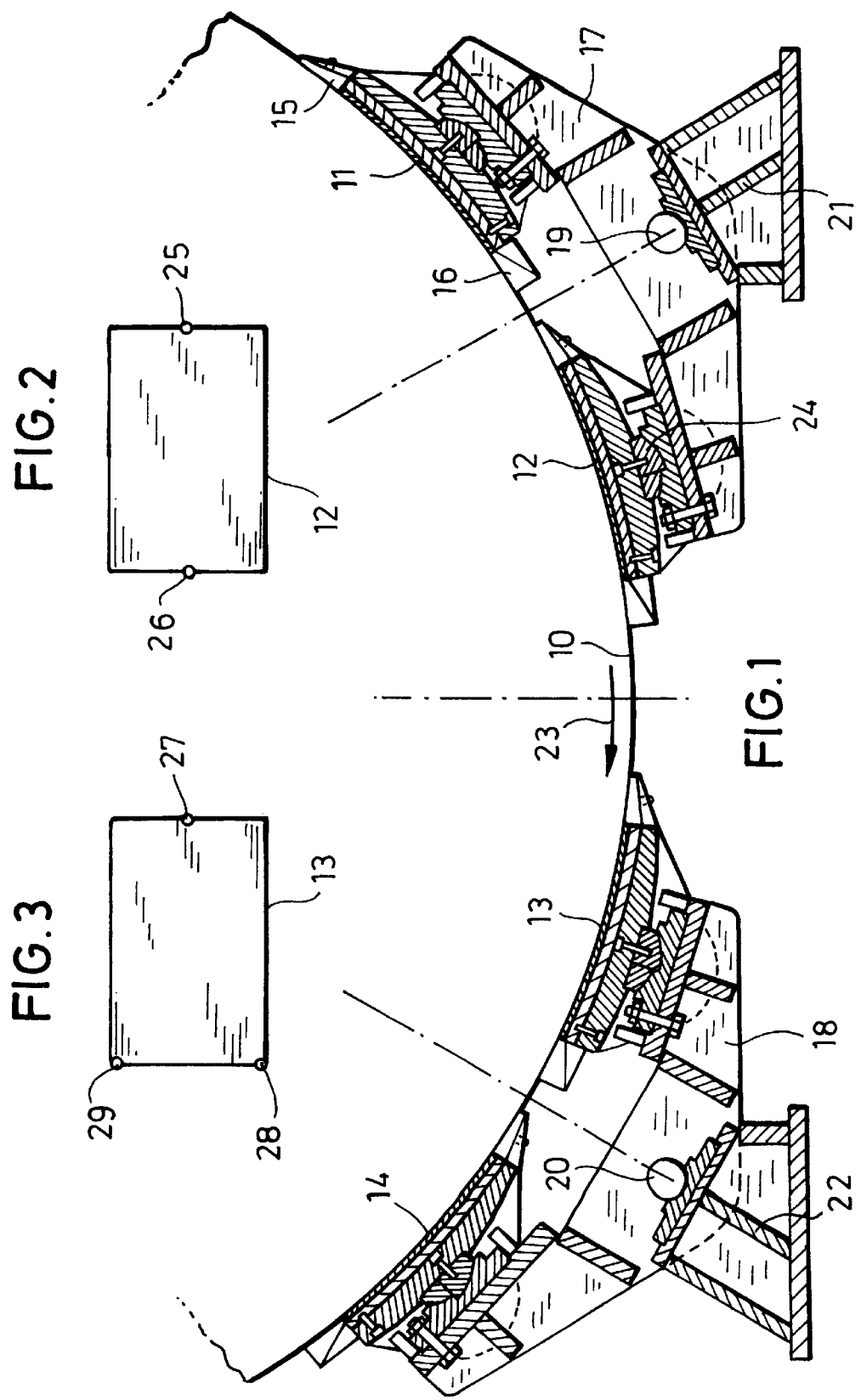

METHOD FOR MONITORING AND CONTROLLING THE OPERATION OF ROTARY DRUMS BORNE ON SLIDING BLOCKS AND A SLIDING BLOCK BEARING THEREFOR

BACKGROUND OF THE INVENTION

The invention is directed to a method for monitoring and controlling the operation of rotary drums borne on sliding blocks such as, for example, tube mills, rotary tubular kilns, etc., that are seated on sliding block shoes charged with compressed oil. The invention is also directed to a sliding block bearing for such rotating drums It is known to bear large, heavy rotary tubes such as, for example, tube mills on a plurality of sliding block shoes that are arranged distributed around the lower rotary tube circumference and are operated hydrostatically and/or hydrodynamically, whereby the rotary tube bears on cushions of compressed oil that is pressed into the lubricating gap between the sliding block shoes and the supported running surface of the rotating drum. For monitoring the operation of the sliding block bearing via a temperature sensor, only the temperature of the compressed oil flowing off from the sliding block was hitherto measured. When the thickness of the compressed oil film carrying the rotary tube or, respectively, the thickness of the lubricating gap becomes too small during operation, the compressed oil heats. During operation of such tube mills borne on sliding blocks, the temperature sensor for the compressed oil was therefore already used to output an alarm signal upon upward transgression of a compressed oil temperature of, for example, 90° C. and to shut the tube mill off when an even higher, maximally allowed compressed oil temperature is upwardly exceeded. Further, the pressure and the flow through quantity of the compressed oil guided in the circulation have been measured by utilizing a pressure monitor and a flow-through monitor.

The measured quantities of temperature, of pressure as well as the flow-through amount of the compressed oil, however, are not necessarily representative of the conditions at the sliding block, particularly for the thickness of the lubricating gap that is present thereat or not present thereat. In particular, the measuring point for the pressure as well as the flow-through quantity of the compressed oil are necessarily at a great distance from the actual location of occurrence, namely from the sliding block supporting surface, if only for spatial reasons. Added thereto is that the measured result of the temperature sensor, of the pressure monitor and/or of the flow-through monitor for the compressed oil has great inertia. At any rate, whether the lubricating gap at the hydrostatically and/or hydrodynamically operated bearing block is adequately large or even zero during operation of a tube mill seated on sliding blocks, could previously not be identified with certainty.

SUMMARY OF THE INVENTION

In rotating drums such as, for example, tube mills, the invention is therefore based on the object of monitoring the function of the sliding block bearing elements in view of the thickness of the hydrostatically and/or hydrodynamically generated compressed oil film or, respectively, compressed oil cushion and controlling the operation in conformity with the result of the monitoring.

For dependable operation of a rotating drum seated on sliding blocks, the crux of the invention is to directly measure the thickness of the lubricating gap during operation, i.e., the distance between the sliding block bearing surface and the rotating drum supported thereon via the lubricating gap or, respectively, the running surface thereof, and to control the operation of the rotating drum dependent on this measured quantity. Primarily, it is inventively identified whether a measurable compressed oil film or, respectively, a compressed oil cushion is present at all at the sliding block bearings. When yes, the rotary tube drive can be started and, for example, the tube mill can be accelerated. When the direct measurement of the lubricating gap yields a measured quantity of zero, the operation of the rotary tube is shut down. In addition to this monitoring and control, the thickness of the compressed oil film when a compressed oil film is identified as being present can also be determined in absolute numbers as a secondary measured quantity and, thus, the height of the lift affected by the sliding block shoes charged with compressed oil can also be identified.

For realizing the direct measurement of the thickness of the lubricating gap, at least one sensor is arranged at each sliding block bearing element of the rotary tube, this at least one sensor directly measuring the thickness of the lubricating gap, i.e., the distance between the bearing surface of the sliding block shoe and the running surface of the rotating drum supported thereon via the lubricating gap or, respectively, pressurized oil film. Inventively, the sensor is an electronic measured value sensor, preferably with an inductively or capacitatively generated measured signal. For obtaining a representative measured value, two sensors are provided per element of the sliding block shoe, namely a sensor in the admission region and a sensor in the discharge region of the sliding block bearing element. According to a particular feature of the invention, even three sensors can be arranged per element of the sliding block shoe, namely a sensor roughly in the center in the admission region and two sensors roughly in the corners of the discharge regions of the sliding block shoe element, as a result whereof the spatial distance allocation of bearing surface of the sliding block shoe and running surface of the rotating drum can be monitored and measured and a potential tilt of monitored sliding block shoes can be identified.

BRIEF DESCRIPTION OF THE DRAWINGS

The invention and further features and advantages thereof are explained in greater detail with reference to exemplary embodiments schematically shown in the figures. Shown are:

FIG. 1 shows a partial cross section through the lower circumferential region of a large, heavy rotary tube such as, for example, a tube mill having, for example, four sliding block shoe elements for the acceptance of the radial load at a bearing station of the rotary tube.

FIG. 2 shows a plan view onto a sliding block shoe element having two sensors.

FIG. 3 shows a plan view onto a sliding block shoe element having three sensors.

DETAILED DESCRIPTION OF THE PREFERRED EMBODIMENTS

According to FIG. 1, the jacket 10 of a tubular mill is radially supported at a bearing station on four sliding block bearing elements 11, 12, 13, 14 distributed around the jacket circumference; the hydrodynamic sliding bearings and their bearing shells filled with compressed oil are matched to the outside contour of the rotary tube jacket 10. 15 respectively indicates an oil admission pocket and 16 respectively indicates an oil discharge pocket of the bearing shells.

So that the sliding bearing shoe elements 11, 12, 13, 14 always automatically adjust, such that the radial distance of the sliding bearing shells from the rotational axis of the rotary tube jacket 10 always has the same size, the neighboring bearing elements 11, 12 and 13, 14 are supported at a common rocker lever 17, 18 which are in turn supported at the foundation via a rocker articulation 19 or, respectively, 20, respectively via a supporting device 21 or, respectively, 22. The sliding block bearing elements, shown in the drawing with reference to the element 12, are also respectively supported at the rocker level via a spherical cap 24, so that the sliding bearing shells can also follow movements of the rotary tube jacket 10 when the angle of inclination of the rotary tube jacket changes relative to the horizontal and/or the rotary tube jacket sags by specific quantities during its rotation or if it were to deform in some other way.

Two sensors 25 and 26 are arranged at every sliding block bearing element, shown with reference to the bearing shoe element 12 of FIG. 1 in FIG. 2 of the drawing, namely a sensor 25 in the admission region 15 and a sensor 26 in the discharge region 16 of the sliding bearing shoe element 12. The rotational sense of the rotary tube jacket 10 of FIG. 1 is indicated with arrow 23. The sensors are electronic measured value sensors with, preferably, an inductively or capacitatively generated measured signal, and they directly measure the lubricating gap thickness in non-contacting fashion, i.e., the distance between the bearing or carrying surface of the sliding bearing shoe element 12 and the running surface of the drum jacket 10 supported directly thereon via the lubricating gap or, respectively, the compressed oil film, during operation of the tube mill.

When the sensors 25 and 26 measure a positive lubricating gap thickness at the hydrostatic start-up lubrication, the tube mill is started up. Conversely, the tube mill is shut off when the sensors 25 and 26 measure a lubricating gap of zero or when a lower limit value of the identified lubricating gap thickness that has been identified is downwardly transgressed.

With reference to the example of the sliding block bearing element 13, the plan view of FIG. 3 shows that three sensors 27, 28, 29 can also be arranged per sliding bearing shoe element, namely a sensor 27 roughly centrally in the admission region 15 and two sensors 28, 29 roughly in the comers of the discharge region 16 of the sliding bearing shoe element 13. With the three sensors per sliding bearing shoe element, the spatial distance allocation of the sliding bearing shoe carrying surface and the running surface of the rotating drum can even be measured and monitored, in order to also be able to identify potential tiltings of the sliding block bearing elements.

The invention can be applied not only to sliding block bearings for the absorption of radial loads but can also be fundamentally employed for sliding block bearings for absorbing axial loads.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method for monitoring and controlling the operation of a rotary drum borne on at least one sliding bearing shoe charged with compressed oil forming a compressed oil film in a gap between a surface of said sliding bearing shoe and a running surface of said rotary drum, comprising the steps of:
    directly measuring a distance between said carrying surface of said sliding bearing shoe and said running surface of said rotary drum supported thereon to obtain a measured quantity, and
    controlling the operation of said rotary drum dependent on said measured quantity.

2. A method according to claim 1, wherein said rotary drum operation is terminated when said measured quantity is zero.

3. A method according to claim 1, wherein said rotary drum operation is terminated when said measured quantity falls below a predetermined value.

4. A method according to claim 1, wherein said measuring is performed by an electronic measured value sensor.

5. A method according to claim 4, wherein said measuring is performed inductively.

6. A method according to claim 4, wherein said measuring is performed capacitatively.

7. A sliding block bearing having at least one sliding bearing shoe for receiving a rotary drum whereby the sliding bearing shoe is charged with compressed oil to fill a lubrication gap between a carrying surface of said sliding bearing shoe and a running surface of said rotary drum received thereon, wherein at least one sensor is arranged at said at least one sliding bearing shoe, said at least one sensor directly measuring said lubrication gap thickness.

8. A sliding block bearing according to claim 7, wherein the sensor is an electronic measured value sensor with an inductively generated measured signal.

9. A sliding block bearing according to claim 7, wherein the sensor is an electronic measured value sensor with a capacitatively generated measured signal.

10. A sliding block bearing according to claim 7, wherein said lubrication gap has an admission region at one end thereof and a discharge region at an opposite end thereof and wherein two sensors are arranged on each sliding bearing shoe, with one sensor in the admission region and one sensor in the discharge region.

11. A sliding block bearing according to claim 7, wherein three sensors are arranged on each sliding bearing shoe with one sensor roughly centrally in the admission region and two sensors near lateral edges of the discharge region.

12. A sliding block bearing according to claim 7, wherein said at least one sensor is connected to at least one of a signal, display, registration and control device for the operation of the received rotary tube.

* * * * *